(12) United States Patent
Bowley

(10) Patent No.: US 7,398,757 B2
(45) Date of Patent: Jul. 15, 2008

(54) TOROIDAL ENGINE METHOD AND APPARATUS

(76) Inventor: Ryan T. Bowley, 528 McKinnon Dr. NE., Calgary, AB (CA) T2E 7B3

( * ) Notice: Subject to any disclaimer, the term of this patent is extended or adjusted under 35 U.S.C. 154(b) by 0 days.

(21) Appl. No.: 11/197,078

(22) Filed: Aug. 3, 2005

(65) Prior Publication Data

US 2006/0032476 A1 Feb. 16, 2006

Related U.S. Application Data

(60) Provisional application No. 60/599,267, filed on Aug. 4, 2004.

(51) Int. Cl.
| F02B 53/04 | (2006.01) |
| F02B 53/00 | (2006.01) |
| F02B 53/06 | (2006.01) |
| F01C 1/00 | (2006.01) |
| F04C 18/00 | (2006.01) |
| F04C 2/00 | (2006.01) |

(52) U.S. Cl. .................. 123/229; 123/228; 123/200; 123/202; 123/241; 418/227; 418/196; 418/191

(58) Field of Classification Search .............. 123/200, 123/202, 241, 249, 228, 229; 418/191, 196, 418/198, 199, 227
See application file for complete search history.

(56) References Cited

U.S. PATENT DOCUMENTS

| 436,663 | A | * | 9/1890 | Holt et al. ............... 418/199 |
| 968,653 | A | * | 8/1910 | Gross ...................... 418/227 |
| 1,071,342 | A | | 8/1913 | Prall ...................... 123/232 |
| 1,136,344 | A | | 4/1915 | Keil ....................... 123/232 |
| 1,246,885 | A | * | 11/1917 | Conklin ................... 123/202 |
| 1,629,202 | A | | 5/1927 | Conklin ................... 418/47 |
| 1,869,053 | A | * | 7/1932 | Dudley .................... 418/227 |
| 2,296,768 | A | * | 9/1942 | Cochran .................. 418/227 |
| 2,362,705 | A | | 11/1944 | MaCartney ............... 123/232 |
| 2,454,006 | A | | 11/1948 | Plummer .................. 123/222 |
| 2,719,513 | A | * | 10/1955 | Dezell .................... 418/196 |
| 2,927,560 | A | | 3/1960 | Breelle ................... 123/209 |
| 3,096,745 | A | * | 7/1963 | Thompson ................ 123/229 |
| 3,260,248 | A | | 7/1966 | Lyle ...................... 123/232 |
| 3,781,146 | A | | 12/1973 | Bates |
| 3,867,912 | A | | 2/1975 | Parr et al. ............... 123/238 |
| 3,913,532 | A | | 10/1975 | Frentzel ................. 123/232 |
| 4,057,035 | A | | 11/1977 | Su ........................ 123/232 |

(Continued)

FOREIGN PATENT DOCUMENTS

JP        03130531 A  *  6/1991  ................ 123/200

*Primary Examiner*—Thai-Ba Trieu
(74) *Attorney, Agent, or Firm*—Michael F. Hughes; Hughes Law Firm, PLLC

(57) ABSTRACT

A rotary motion device having piston valves that define an open region that are adapted to engage a power tooth of the power ring as the power ring rotates around the piston valves and the piston valves rotate about their own separate axis that is fixed with respect to the base housing of the device. The power ring is provided with radially inward and outward ports in one form that are adapted to communicate with radially inward and outward ports of a static member of the device. The ports are utilized to compress and expand a gas and in one form are utilized for an internal combustion chamber to create an internal combustion rotary motion device.

9 Claims, 14 Drawing Sheets

U.S. PATENT DOCUMENTS

| | | | |
|---|---|---|---|
| 4,741,308 A | 5/1988 | Ballinger | 123/231 |
| 5,090,501 A | 2/1992 | McNulty | 418/227 |
| 5,797,366 A | 8/1998 | Adamovski | 123/237 |
| 5,816,789 A | 10/1998 | Johnson | 418/227 |
| 6,132,197 A | 10/2000 | Adamovski et al. | 418/191 |
| 6,250,277 B1 | 6/2001 | Adamovski et al. | 123/238 |
| 6,276,329 B1 | 8/2001 | Archer | 123/228 |
| 6,488,004 B1 | 12/2002 | Adamovski | 123/232 |
| 6,546,908 B1 | 4/2003 | Pekau | 123/206 |
| 6,672,274 B2 | 1/2004 | Winterpacht | 123/232 |
| 6,782,866 B2 * | 8/2004 | Duncan | 123/241 |

* cited by examiner

TOROIDAL ENGINE METHOD AND APPARATUS

RELATED APPLICATIONS

This application claims priority benefit of U.S. Ser. No. 60/599,267, filed Aug. 4, 2004.

BACKGROUND OF THE DISCLOSURE

Many internal combustion type engines are well-known in the prior art. In general, a combustion type engine utilizes the energy from an expanding combustion gas to extract work therefrom. The rotary motion device described herein is believed to overcome disadvantages seen in the prior art and provide a new useful and nonobvious design. Of course, in the broader scope, various versions of the device can be utilized for the other purposes such as a pump or a compressor as described herein.

The embodiments herein show various devices comprising internal rotary valves and a power ring. The rotary valves are inside a casing and rotate with the machine so friction is minimized which is problematic and common with some other devices. In one form, the combustion chamber is separate so that it is not an integral part of the rotary valve or housing configuration. In other words the combustion chamber can be located in different positions and can be different shapes with out hurting the function of the chamber. This arrangement is similar to Rudy Pekua's engine and possibly a few others. However, having a separate combustion chamber has the advantage of being a part that is separately engineered in terms of materials to minimize heat loss through the combustion chamber walls. The combustion chamber can be readily interchangeable to provide different compression ratios to accommodate the detonation properties of different fuels.

The combustion chamber is controlled through porting system that allows for constant volume combustion and high volumetric flow efficiencies and reduces parts used to control the valving significantly.

In some embodiments there are probably more pistons than rotary valves and most likely an odd number. This insures that the motor is running in a unsymmetrical and alternating fashion. An unsymmetrical orientation should smooth operation and average the torque output. For example as one piston is traveling through a valve another is a third through its power stroke and another is two thirds through its power stroke. With a motor embodiment this insures there are no dead torque spots.

The rotary valves are not equally spaced in certain embodiments. This allows for a very efficient super expansion cycle that cannot be done by the competitors with equally spaced rotary valves. It can be done in a different manor seen in one of the patents where different sized rotors are stacked axially but it cannot be done in one unit as of now.

The device further has a planetary gear arrangement with a sun gear that acts as the power output shaft that spins at a greater rotational velocity than the power ring. Basically the engine rotates higher than the power ring increasing the usability of the unit as a production engine.

Present analysis indicates that the device described herein appears to be quite easy to machine compared to other prior art devices. As well it looks to have better wear characteristics than the perpendicular valved engines.

The rolling seal between the rotary valve and the piston ring is preloaded more when higher pressures are present, this is done by small increases to the diameter of the power ring in certain locations or increasing the valve diameter in curtain locations.

For engine embodiments there can be fewer pistons than rotary valves. This allows intake and exhaust stroke waiting periods. These waiting periods insure the intake receives a full charge of air and lets the combustion almost fully expand before a new charge is compressed in to the combustion chamber. For the exhaust the pressure is reduced to atmospheric pressure before being forced out by a piston to reduce back torque.

SUMMARY OF THE DISCLOSURE

Discussed in detail below is a rotary motion device adapted to convert energy. The device comprises a power region having a power ring having a center rotation axis and having a plurality of power teeth. The power ring further has a compression port and an expansion port. The compression port is positioned at a first radial distance from the center rotation axis and the expansion port is located at a second radial distance from the center rotation axis.

The devices further has a plurality of piston valves having slot regions. There is further a base block having an entrance port corresponding in location radially from the center rotation axis to the second radial distance and an outlet port located at an approximate first radial distance from the center rotation axis and adapted to communicate with the compression port. With an engine design there is a combustion chamber in communication with the inlet port and outlet port of the base block.

The power teeth are adapted to engage the slot region of the piston valves to provide a seal between a forward chamber and a rearward chamber of a power tooth when the tooth is engaged in the slot region. The expansion port does not communicate with the inlet port and the outlet port does not communicate with the compression ports during the rotation of the power ring with respect to the base block.

BRIEF DESCRIPTION OF THE DRAWINGS

FIG. 9 shows compression of the gas in a chamber ahead of the power tooth where the compression ports are in communication with a combustion chamber;

DETAILED DESCRIPTION OF THE PREFERRED EMBODIMENTS

Figure 1:
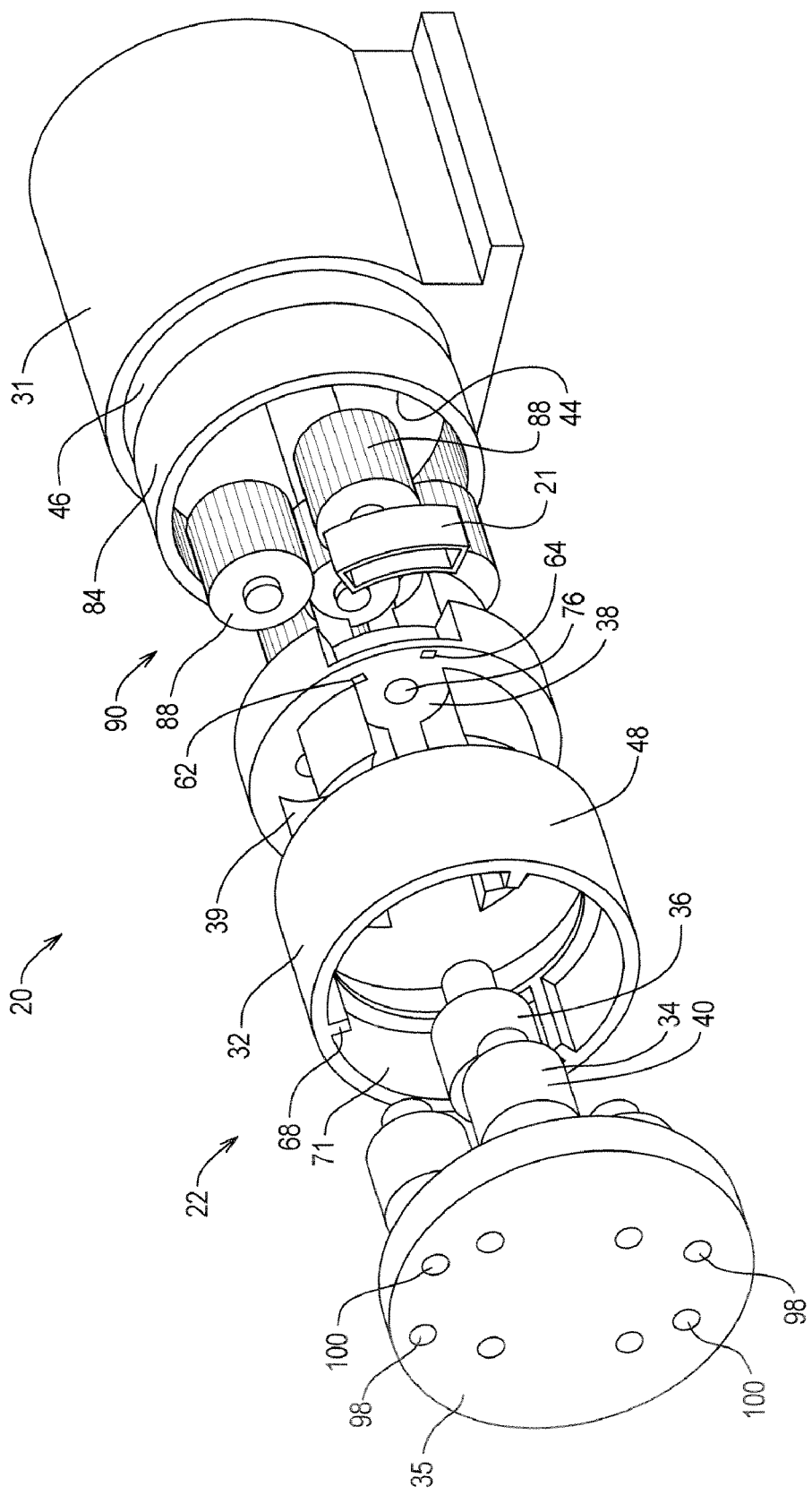
FIG. 1 shows an exploded isometric view of the rotary motion device.

There will now be a description of the toroidal engine 20 whereby a longitudinal axis 12 indicates a longitudinal direction as shown in FIG. 1. Further, from the center of rotation of the internal gears 82 and inner wheel 36 defines a center point where extending from the center point indicates a radial direction.

The rotary motion device 20 comprises a power region 22 and a gear coupling region 24 as shown in FIG. 1. In general, the device 20 in one form is an internal combustion engine where the power region 22 is adapted to utilize a combustion chamber 21 in a series of outer radial ports to compress gas and extract power from expanding gas from the combustion chamber 21 to provide output work.

Figure 6:
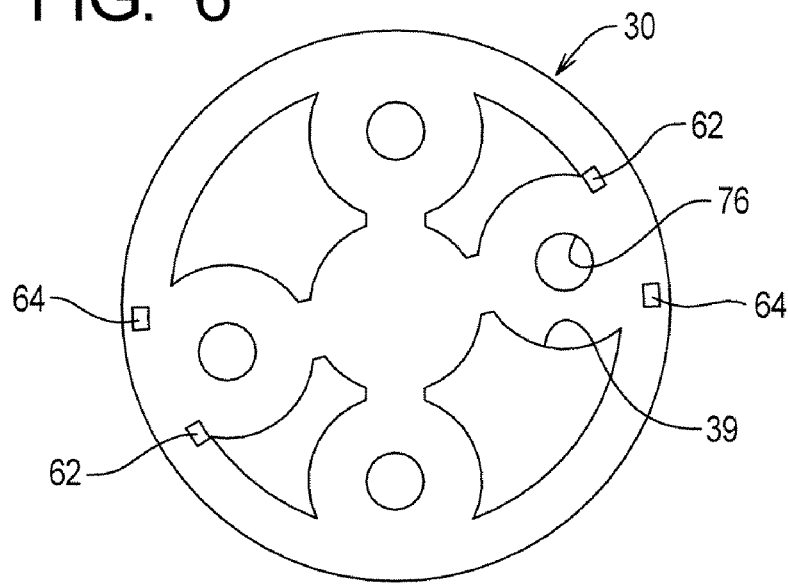
FIG. 6 shows a front view of the base block showing the inlet and outlet ports and their radial location with respect to the center axis of rotation of the device.
Figure 8:
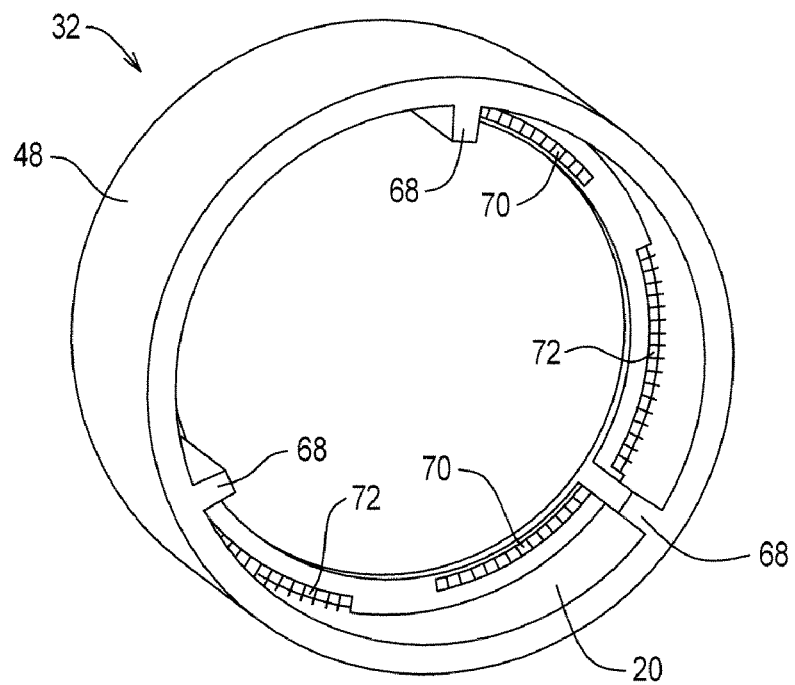
FIG. 8 shows an isometric view of the power ring with the compression expansion ports positioned thereon.

More specifically, briefly referring to FIGS. 14-22, there is a progressive set of images that schematically show a combustion cycle. It should be noted that the ports are shown in a schematic fashion in these figures for ease of explanation and illustration. However, as described in detail below, the ports are staggered radially from one another as shown in FIGS. 6 and 8 to provide selective communication between the inlet ports and the outlet ports.

Figure 14:
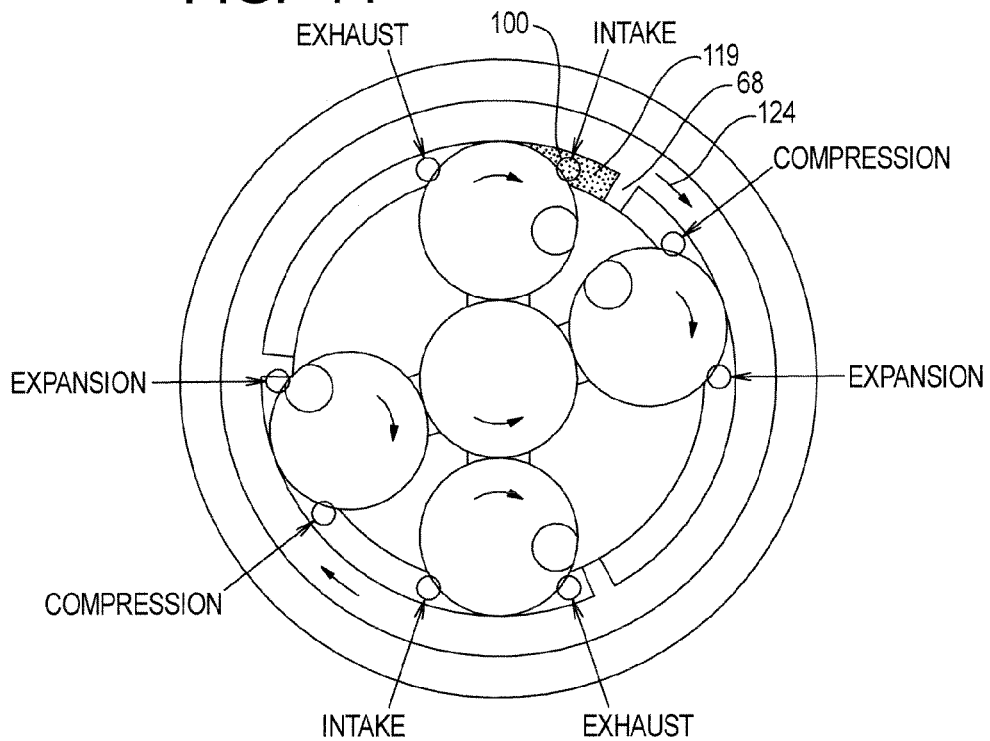
FIG. 14 is part of a series of figures from FIGS. 14-22 where FIG. 14 schematically shows an intake of air preceding the power tooth in the upper right hand portion approximately at the one o'clock location.
Figure 15:
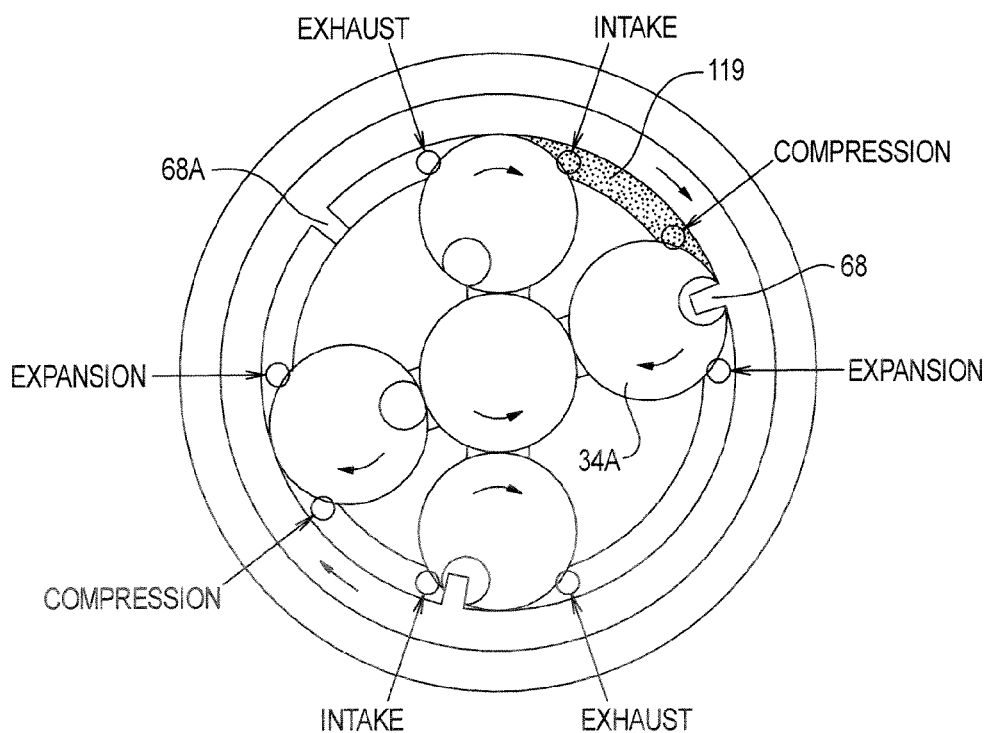
FIG. 15 shows a chamber filled with air before being compressed.
Figure 16:
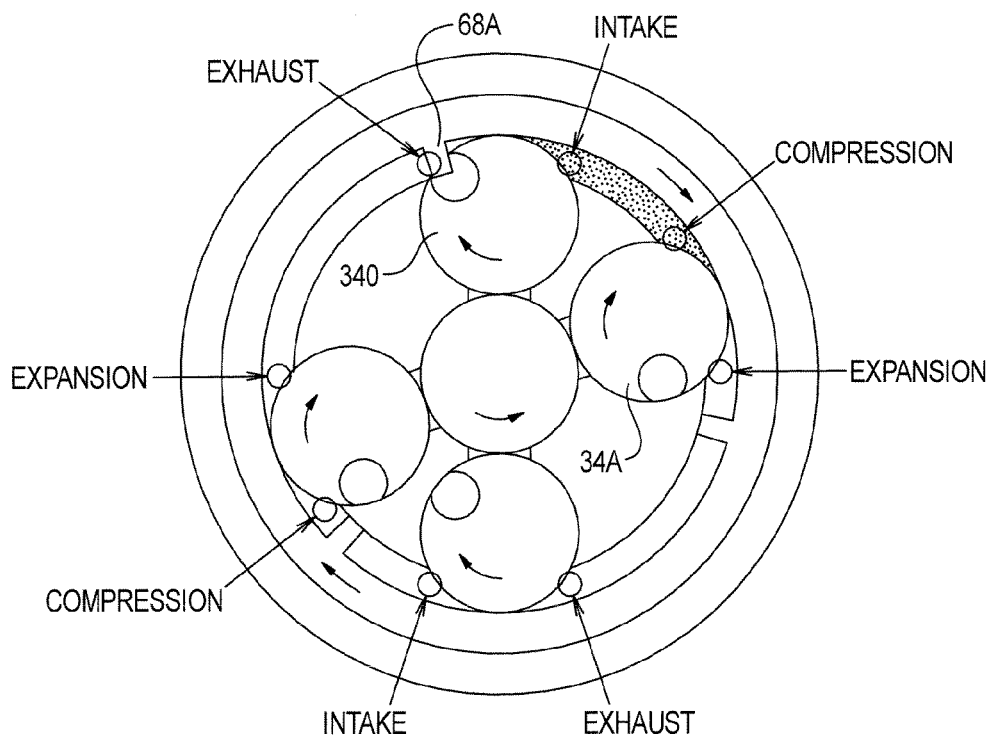
FIG. 16 shows a preceding tooth passing a piston valve at the twelve o'clock location prior to compressing the chamber shown at the one o'clock position.
Figure 17:
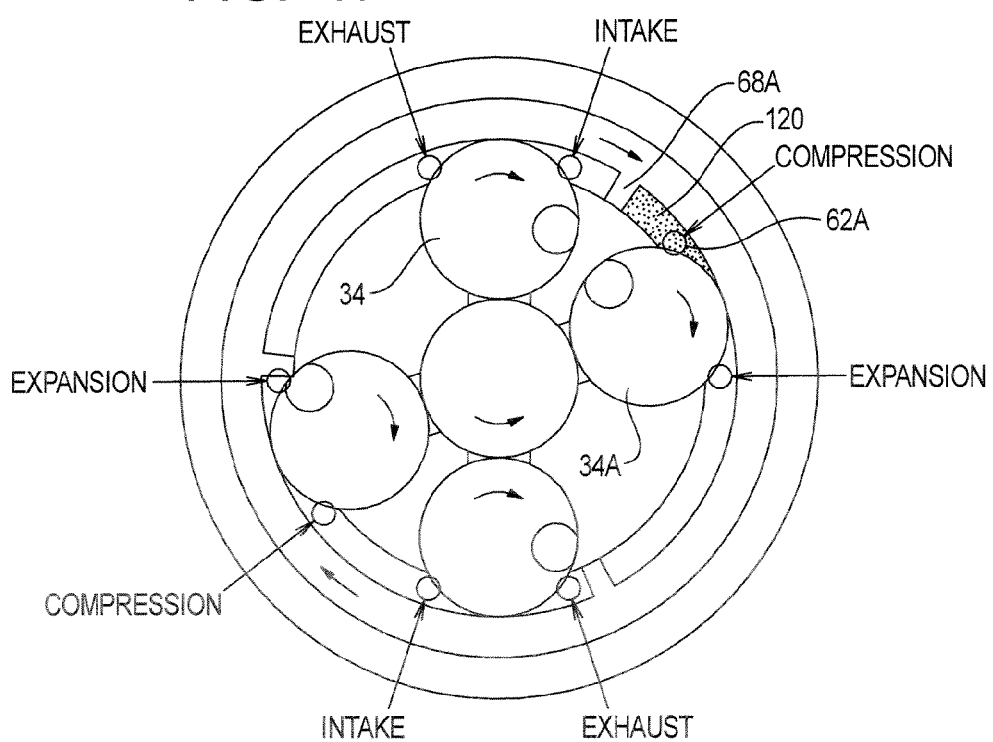
FIG. 17 shows a power tooth compressing the chamber at the approximate two o'clock location where the power ring is in communication with a combustion chamber and the air is being compressed therein.
Figure 18:
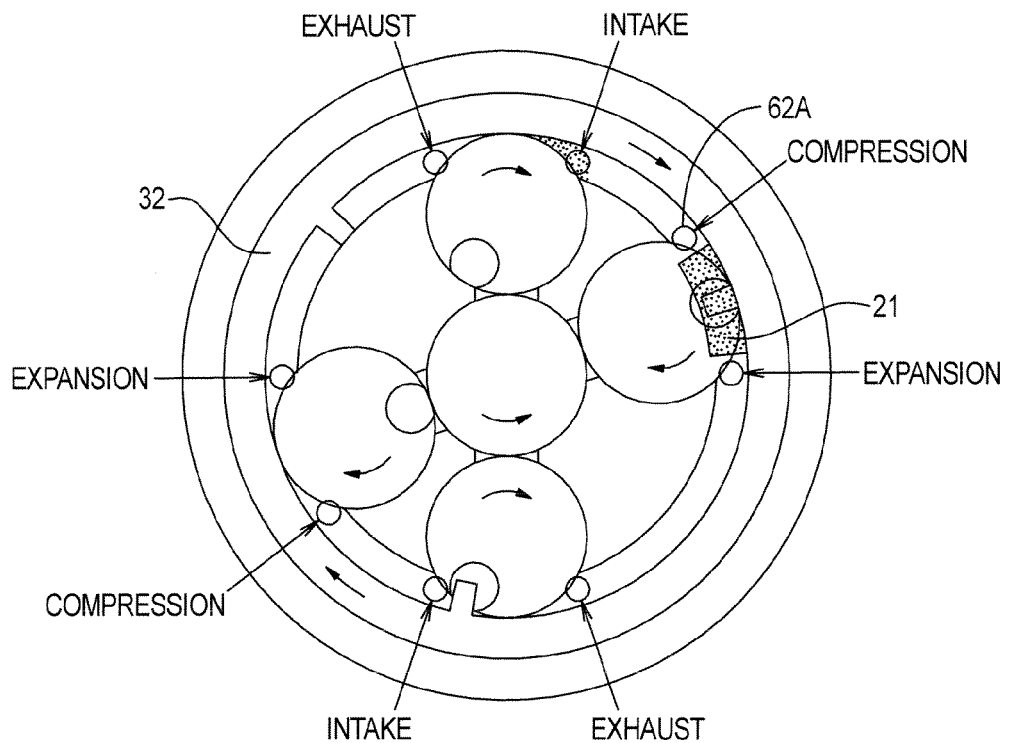
FIG. 18 shows a power tooth at a center position with respect to any piston ring where ignition of the compressed gas mixed with fuel is occurring and is schematically shown.

In general, as shown in FIG. 14, there is an intake of air to the port indicated at 100 to the chamber 119 which precedes the power tooth 68. As the power tooth 68 passes by the piston valve 34A, the chamber 119 is essentially full of air that is to be compressed. As shown in FIG. 16, the power tooth 68a is passing by the piston valve 34D. Now referring to FIG. 17, the trailing tooth 68a is now compressing the chamber 119 and the compressed gas is passing through the compression port schematically indicated at 62a. Now referring to FIG. 18, the compression/inlet port 62a is now closed by way of an arrangement of the compression ports of the power ring 32 and the inlet port as described in greater detail below. Essentially, FIG. 18 shows how the gas is compressed with a fuel mixture in a combustion chamber located behind (or in front) of the rotor assembly portion. FIG. 18 further signifies a combustion in the combustion chamber where now referring to FIG. 19, as the power ring 32 advances, the power tooth 68a is now past the piston valve 34A and the expanded gas indicated at 11a is passing through the expansion port schematically indicated at 64a. Essentially, the higher pressure gas is pressing against the rearward surface 75 of the power tooth 68a.

Figure 20:
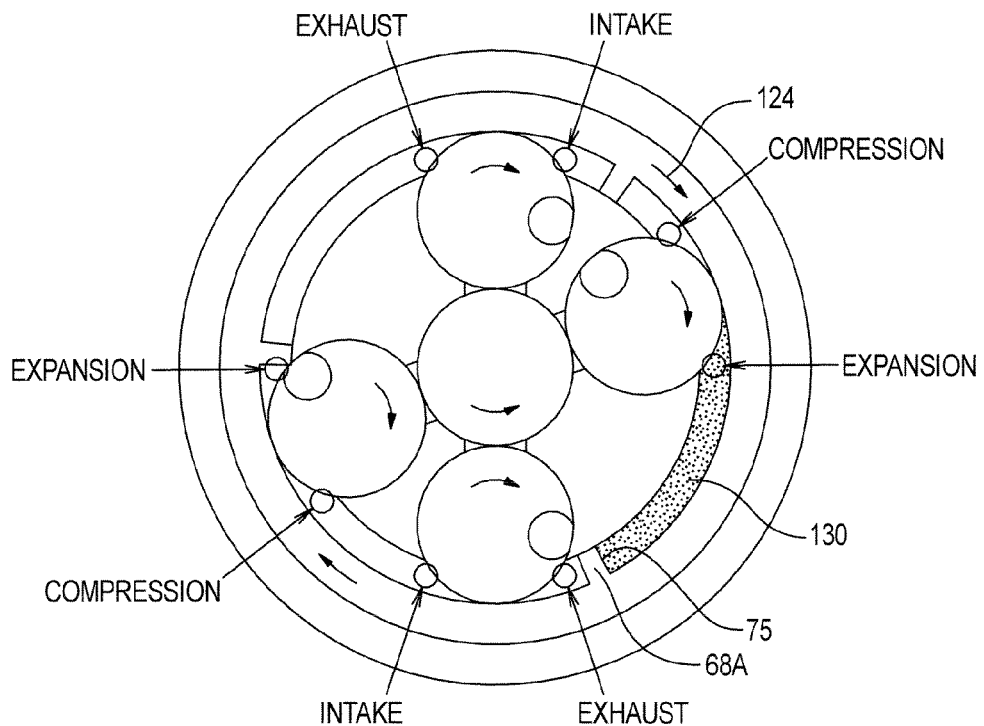
FIG. 20 shows almost a full energy extraction of the combusted gas where the power tooth is advanced to the approximate five o'clock position.
Figure 21:
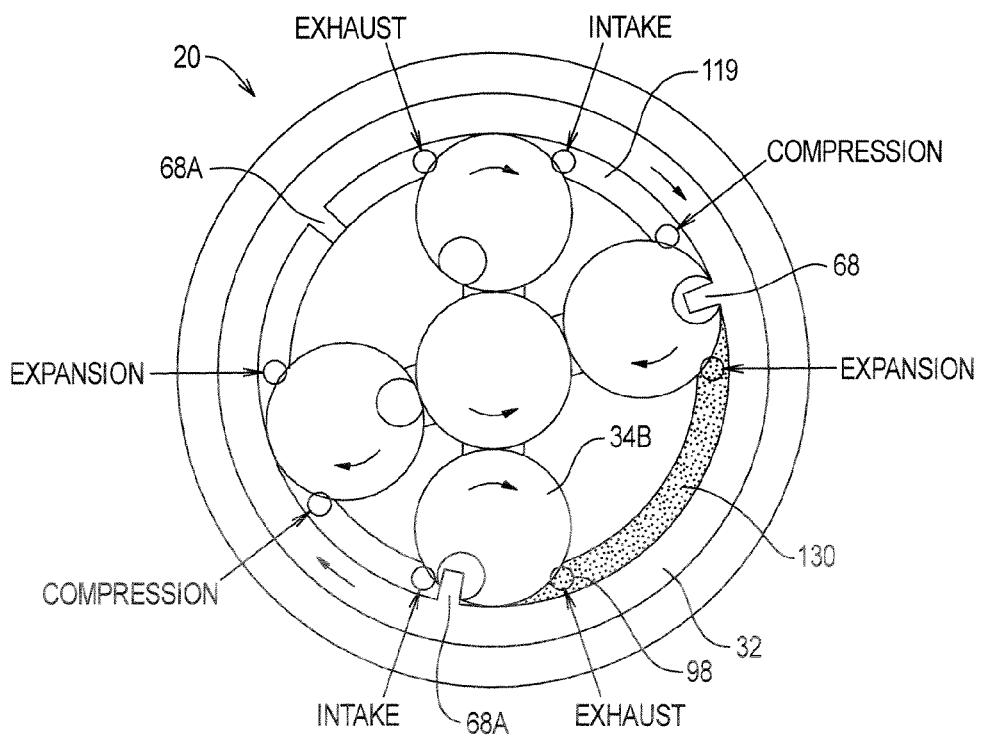
FIG. 21 shows the power tooth at the approximate six thirty location where the chamber at the three o'clock to six o'clock position is now being vented to an exhaust port.
Figure 22:
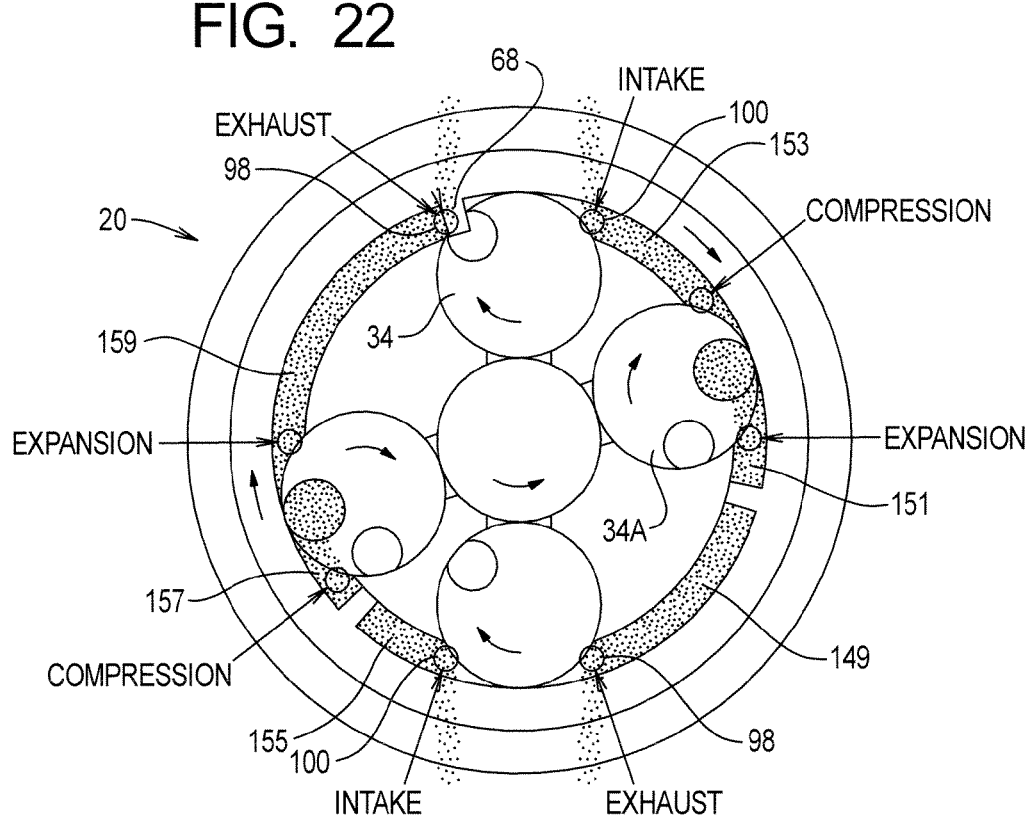
FIG. 22 is a schematic view showing the simultaneous occurrence of various states within the chambers at various radius locations about the device.

FIG. 20 shows the chamber 119a continuing to expand with the combusted gas as the power ring 32 advances in a clockwise fashion. FIG. 21 now shows the power tooth 68a advancing past the piston valve 34B where the power ring 32 is now in communication with the exhaust port 98 to vent the gas. Of course this process is occurring at other portions radially orientated about the device 20. As shown in FIG. 22, there is another schematic figure of the process.

Figure 23:
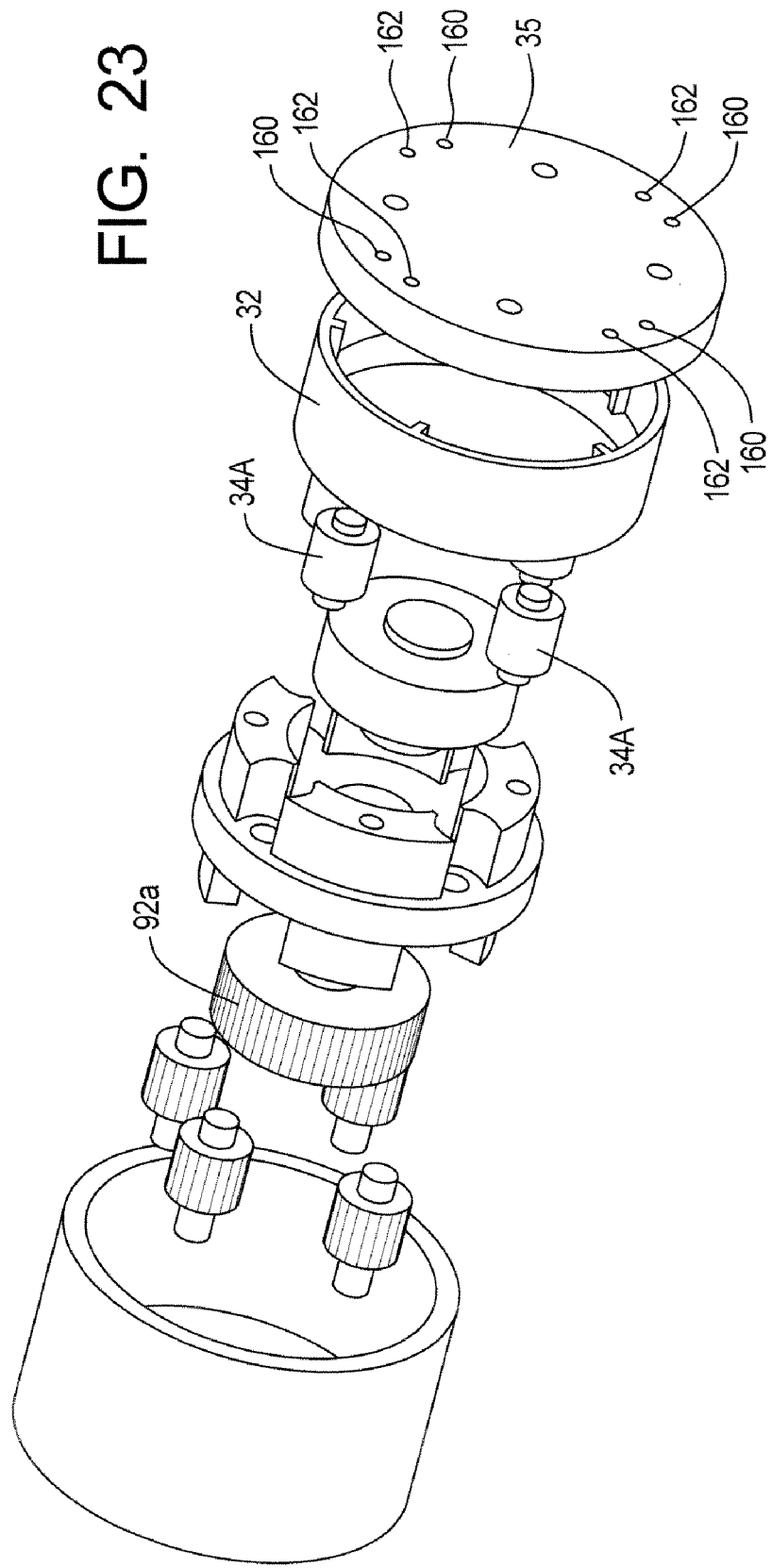
FIG. 23 shows an exploded isometric view of a pump embodiment where the ports are orientated somewhat differently from the previous embodiment.
Figure 24:
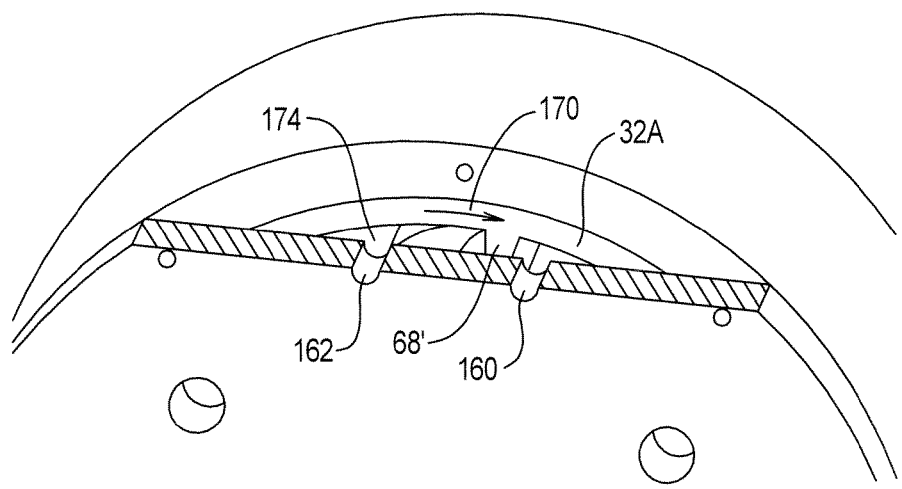
FIG. 24 shows the partial sectional view illustrating inlet and outlet ports for fluid to pass therethrough.

It should be further noted that the device can function as a positive displacement pump with a different type of porting arrangement as shown in FIGS. 23 and 24.

Figure 4:
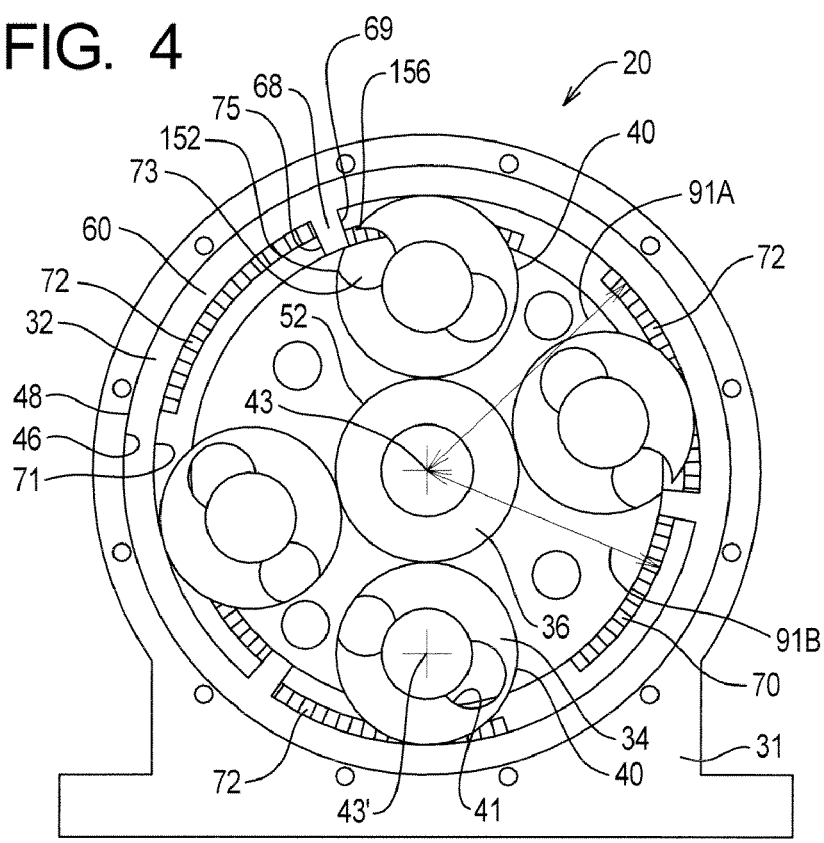
FIG. 4 shows a front view of the rotary motion device with the cap removed exposing the piston valves and illustrating the relationship of the compression expansion ports on the power ring and their respective radial locations.

One last initial introduction to the reader is made with reference to FIGS. 4 and 6 where the above-mentioned communication of compression and expansion ports is accomplished without a back flow of the gas by having the compression ports indicated at 70 that are adapted to communicate with the inlet port 62 as shown in FIG. 6 of the base block 30. In a like manner, referring back to FIG. 4, the expansion ports 72 are adapted to communicate with the radially outward located port 64 (the outlet or expansion port 64) of the base block 30. Therefore, it can be appreciated that the ports operate effectively as valves similar to a two-stroke engine except with the various benefits of non-cross-communication of combusted and non-combusted gas as well as other benefits as can be appreciated by reading the disclosure herein.

With the foregoing basic introduction in mind, there will now be a more detailed description of the various componentry provided to make up one form of the invention, where of course similar types of arrangements and modifications can be made without departing from the spirit and intent of the invention.

As shown in FIG. 1, the power region 22 comprises a base block 30, a power ring 32 and a plurality of internal piston valves 34. The power system further comprises an inner rotary wheel 36. The base block 30 comprises a plurality of partially introverted cylindrical chamber regions 38 which have inverted cylindrical partial surfaces 39 (see also FIG. 7).

The surfaces 39 are adapted to engage the partially cylindrical surfaces 40 of the internal rotary piston valves 34. The base block 30 further comprises an outer peripheral recessed region 44 comprising an inner cylindrical surface 46 and a rearward surface 45.

Figure 7:
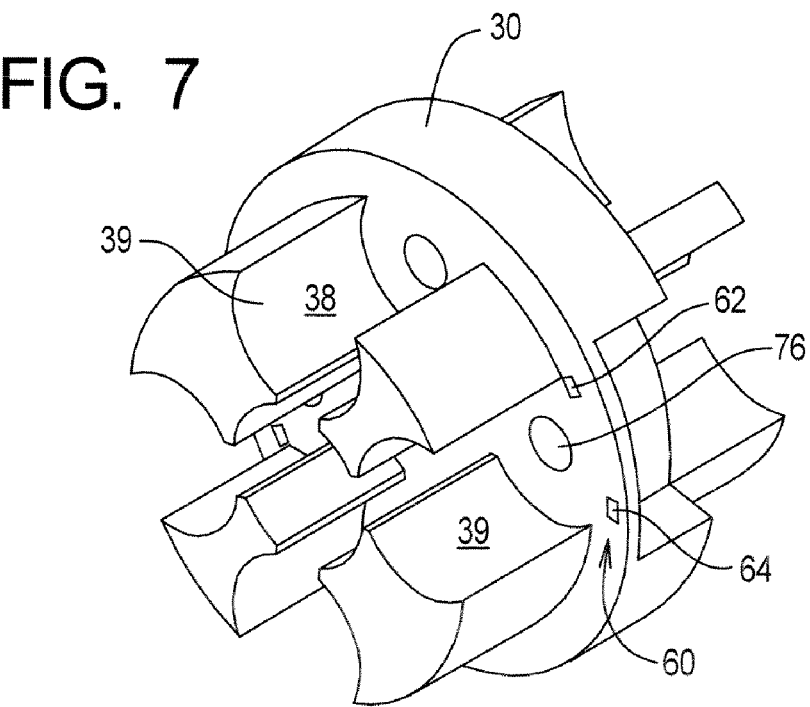
FIG. 7 shows an isometric view of the base block.

As shown in FIG. 7, the base block 30 further comprises a porting system 60 that has an inlet port 62 and an outlet port 64. As shown in FIG. 1, the inlet port 62 is positioned at a radially separate location from the outlet port 64. In one form, the inlet port 62 is radially outwardly with respect to the port 64. Essentially this means that in the tangential direction from any point along the ports 62 and 64 there will not be any overlapping open portion. The ports 62 and 64 are in communication with the combustion chamber 21. (See FIG. 1).

Figure 3:
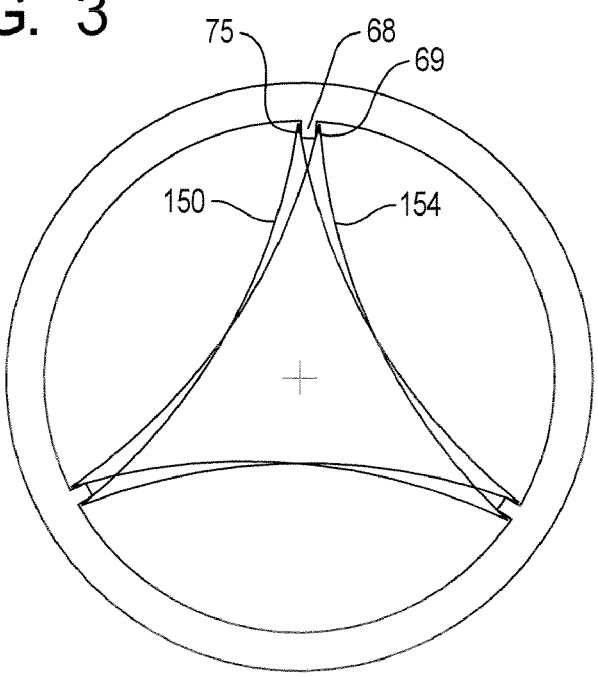
FIG. 3 shows the method of defining both the trailing and leading surfaces of a power tooth.
Figure 5:
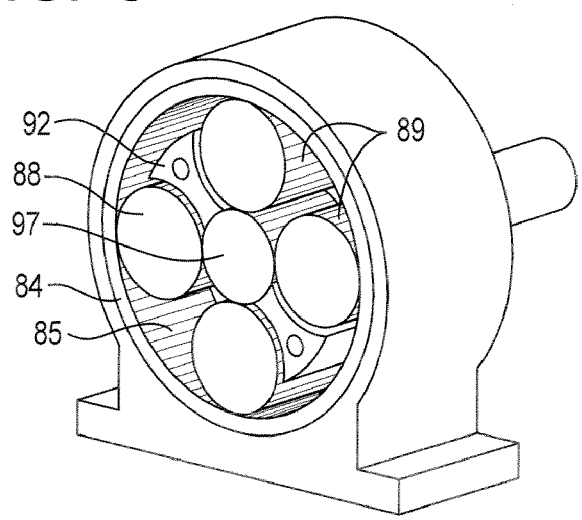
FIG. 5 is a sectional view of the gearing system that is coupled to the piston valves.

As shown in FIG. 8, the power ring 32 comprises a plurality of power teeth 68. The power ring 32 has a radially outward surface 48 that is adapted to engage the surface 44 of the base housing 31. As shown in FIG. 3, the power ring 32 has compression ports 70 and expansion ports 72. The compression ports 70 are adapted to engage the inlet port 62 which is in communication with the combustion chamber 21. The expansion ports 72 are in communication with the outlet port 64 that is best shown in FIG. 1. The process of this communication will be described further herein. The power ring 32 further comprises a partially cylindrical inward surface 71 that is adapted to engage the partially cylindrical outer surfaces 40 of the internal piston valves 34. The power teeth 68, as shown in FIG. 5, have a forward surface 69 and a rearward surface 75. The surfaces aid in defining chambers as described further herein.

As shown in FIG. 4, the internal rotary piston valves 34 comprise slot regions 73 that are adapted to have the power teeth 68 fit therein. It should be noted that the outer surface 40 of the internal piston valves 34 are adapted to be received by the surfaces 39 of the base housing 31 (see FIG. 1).

Figure 2:
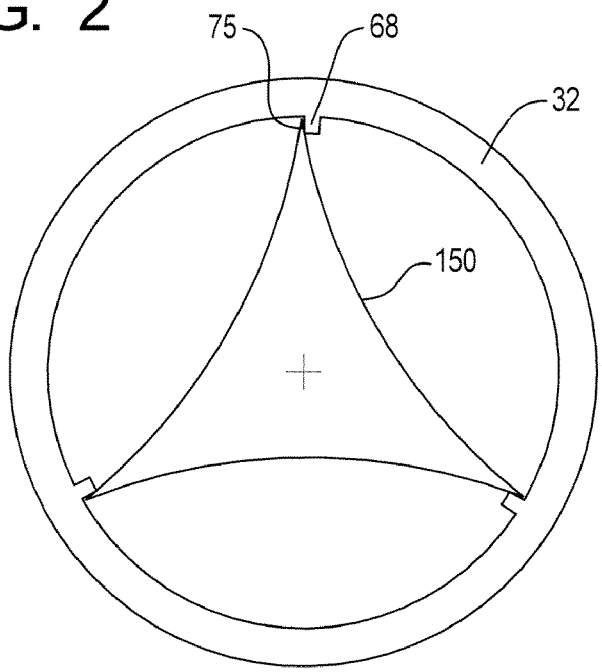
FIG. 2 shows a schematic method of defining a trailing or leading contact surface of a power tooth of the power ring.

Now referring to FIGS. 2 and 3, there is shown a schematic view of the method of constructing the power teeth 68 that are adapted to engage the slot region 73 of the piston valves 34. As shown in FIG. 2, the line 150 shows the path of rotation of the trailing surface 152 of the piston valve 34 (see FIG. 4). This path with respect to the power ring 32 schematically shown in FIG. 2, is utilized to construct the trailing/rearward surface 75 of the power tooth 68. Now referring to FIG. 3, there is shown a second line 154 that represents the surface 156 as shown in FIG. 4. In a like manner, this reference line is utilized to define the forward surface 69 of the power tooth 68.

The following equation of the tooth curve defines the trailing rearward surface 75 and the forward surface 69 of the power tooth 68 as previously discussed:

Equation of Tooth Curve (fq)
RD=Power Ring Diameter
VD=Valve Diameter
Z=RD/VD
RA=Radius from ring axis to valve axis=$RD/2*(Z-1)/2$.
RB=Radius of valve=$VD/2=RD/(2Z)$ $$\{x,y\}fq=\{RA*Sin(q)+RA*Cos(q), RB*Sin(q*(1-Z))+RB*Cos(q*(1-Z))\}$$

As shown in FIG. 4, the internal wheel 36 has an outer cylindrical surface 52 that is adapted to sealingly engage the surface 40 of the internal piston valves 34. It should be noted that the surfaces 48 and 46 are adapted to be sealingly engaged as well as the surfaces 40 and 71 of the internal piston valves 34 and the power ring 32 respectively.

As shown in FIG. 4, the first radial distance 91A defines a first distance from the center rotation axis 43 to the approximate radial central location of the compression ports 70.

Further, the dimension indicated at 91B indicates that approximate distance to the expansion ports 72. The defined distances 91A and 91B are not equal and when is greater than the other in the corresponding inlet and outlet ports as shown in FIG. 6 are different radial locations as well. It should be further noted that the piston valves can have a recessed region 41 which is positioned opposing the slot region 73 so the piston valve is are substantially inertial a balanced about their center axis of rotation 43' which is a static axis with respect to the casing 31.

It should be noted that in one form, the power ring having a cylindrically inward surface 71 that is not a perfect cylinder but rather as certain really inward protrusions and define locations to aid in the ceiling of the outer surface 40 of the piston valve is 34. Such slight extensions would occur in orientations about the cycle where expansion is undertaking and a tighter seal may be necessary. Therefore, referring ahead to FIG. 19, it can be seen that the approximate location indicated at 71' could have a slight inward extension of say a few thousands of an inch to engage (e.g. 0.003") the outer surface 40 of the piston valve 34A. Of course this is an optional feature which can be utilized if the pressures within the chamber 130 are particular high in a given application.

There will now be a description of the coupling region 24 with reference continuing on FIG. 1 and FIG. 5. The base block 30 in one form separates the regions 22 and 24. A plurality of throughput passages in the base plate 30 provides communication of gas and couplers. The gears 88 which partially comprise the gearing system 90 are coupled through the opening 76 of the base block 30 to the internal piston valves 34 and are adapted to rotate therewith (see FIG. 1). The outer ring 84 is shown in FIG. 5 and represents the outer ring of a planetary gear system where an internal surface 85 has a plurality of teeth that are adapted to engage external teeth of the gears 88 which are positioned on the outer perimeter surface indicated at 89. Further, the internal power gear 92 has a plurality of teeth positioned on the outer perimeter region 93 and is expected to extract power from the shaft 97. Of course the internal piston valves 34 are held in place by the surface 39 of the base block 30; however, a bearing system can be employed to position the gears 88 in place. It should be noted that the outer ring 84 is coupled to and operatively connected to the power ring 32 (see FIG. 1).

Referring back to FIG. 1, the rotary motion device 30 further comprises a base housing 31 and cap 35 to complete the assembly. Of course, various elements could be combined and integrated such as the outer ring 84 and the base housing 31, for example. It should be noted that the cap 35 defines exhaust ports 98 and inlet ports 100.

Figure 9:
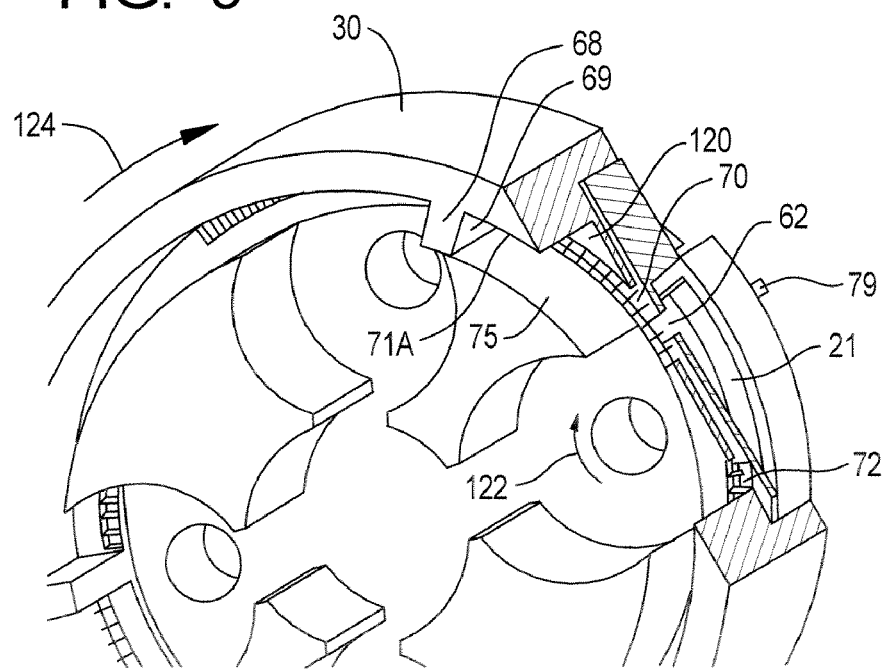
FIG. 9 is a part of the series of progressive of FIGS. 9-13 where

Now referring to FIG. 9, there is shown the first stage of a combustion cycle where a chamber 120 is defined. The chamber 120, as shown in FIG. 9, is sealed whereby the forward surface 69 of the power tooth 68, the cylindrical inward surface 71A, the partial cylindrical outward surface 75 and the partial cylindrical surface 40A of the rotary piston valves 34A (not shown in FIG. 9) comprise the sides of the sealed chamber. The expansion ports 72 of the power ring 32 are not in communication with the inlet port 62 of the base block 30 that is in communication with the interior combustion chamber 21 (see FIG. 1). As mentioned above, the openings 72 are positioned at a radially outward location with respect to the radially inward most position of the port 62 as shown in FIG. 1. Of course, other radial orientations and positions can be provided such as if the ports 72 and 70 were inverted and the ports 62 and 64 were radially inverted in a corresponding manner.

Figure 10:
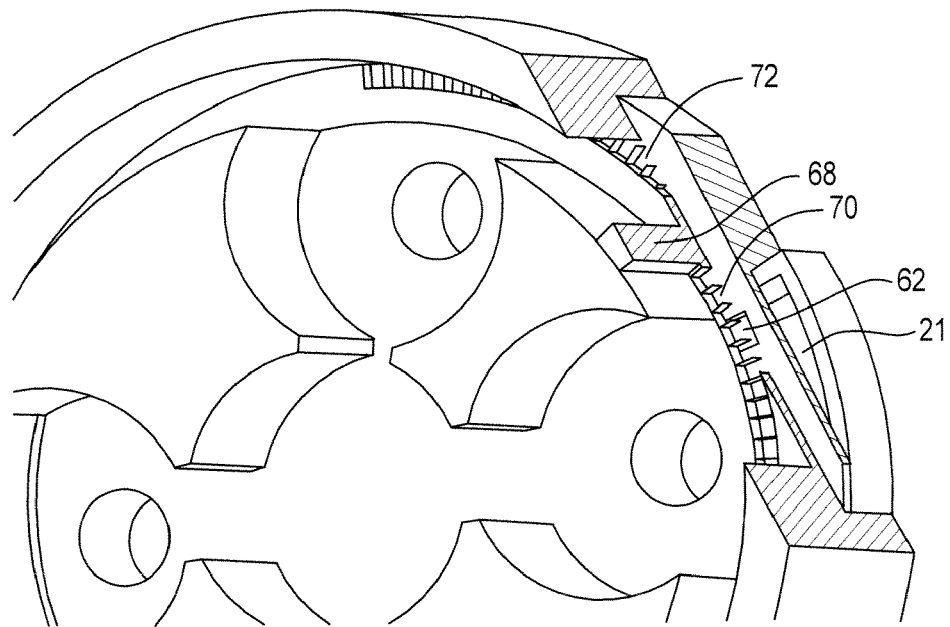
FIG. 10 shows further compression of the gas in the partial sectional view where a combustion chamber is shown as well as a portion of the power tooth.

Therefore, referring back to FIG. 9, as the inner piston valves 34 rotate in a manner as indicated by arrow 122 and the power ring 32 rotates in the direction as indicated by rotational vector 124, it can be appreciated that the chamber 120 reduces in volume hence compressing the gas therein. Now referring to FIG. 10, it can be appreciated that the chamber 122 is substantially reduced in volume. It can further be appreciated that the inlet ports 70 are in communication with the inlet port 62 (see FIG. 1) and the compression ports pass the 12 o'clock position are not in communication with the compression port 64.

Figure 11:
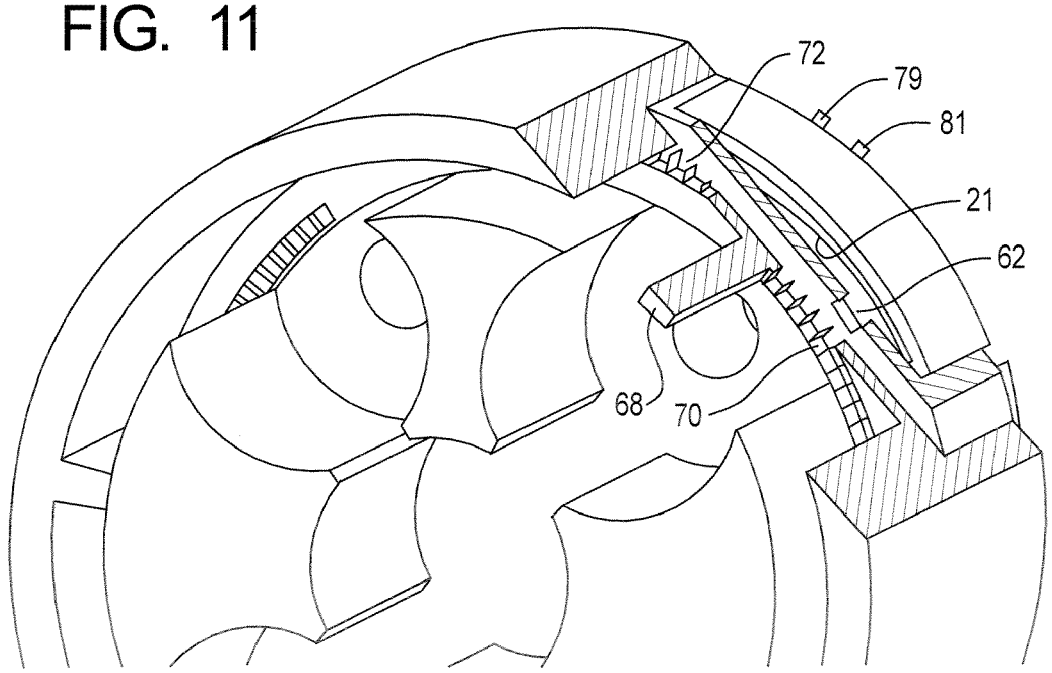
FIG. 11 shows the tooth at a top dead center position where at some point combustion occurs within the combustion chamber and pressure builds up therein.
Figure 12:
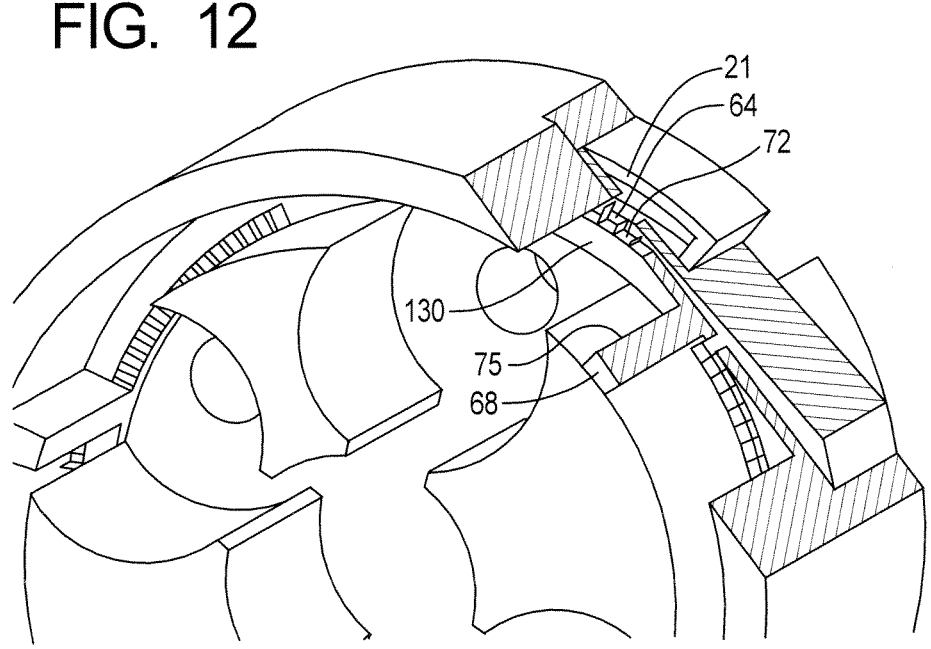
FIG. 12 shows a progressive view of the previous figure where the partial sectional view shows the power tooth past the top dead center where the expansion ports are in communication with an outlet port of the combustion chamber and expanding gas is pressing against the trailing surface of the power tooth.

Now referring to FIG. 11, the power stroke begins whereby during the transition where the notch power tooth is at the 12 o'clock position, and at some point depending on the timing cycle an ignition occurs by an igniting device schematically shown as 79 in FIG. 11 where a combustion material can either be injected by a fuel injector type apparatus schematically shown as 81 or by a carburetor like device (not shown) prior to the compression of the gas shown in the preceding figures. The gas contained in the combustion chamber 21 increases in pressure and is allowed to expand and is vented through the outlet port 64 as shown in FIG. 12. As mentioned above, the outlet port 64 is in communication with the expansion port 72 whereby chamber 130 which precedes chamber 122 in rotational location is now an expansion chamber. The rearward surface 75 of the power tooth 68 provides surface area components in the longitudinal and radial direction whereby a tangential force is exerted thereon. In other words, the pressure within the chamber 130 acting upon the tangential surface area 75 provides a clockwise torque upon the power ring 32.

Figure 13:
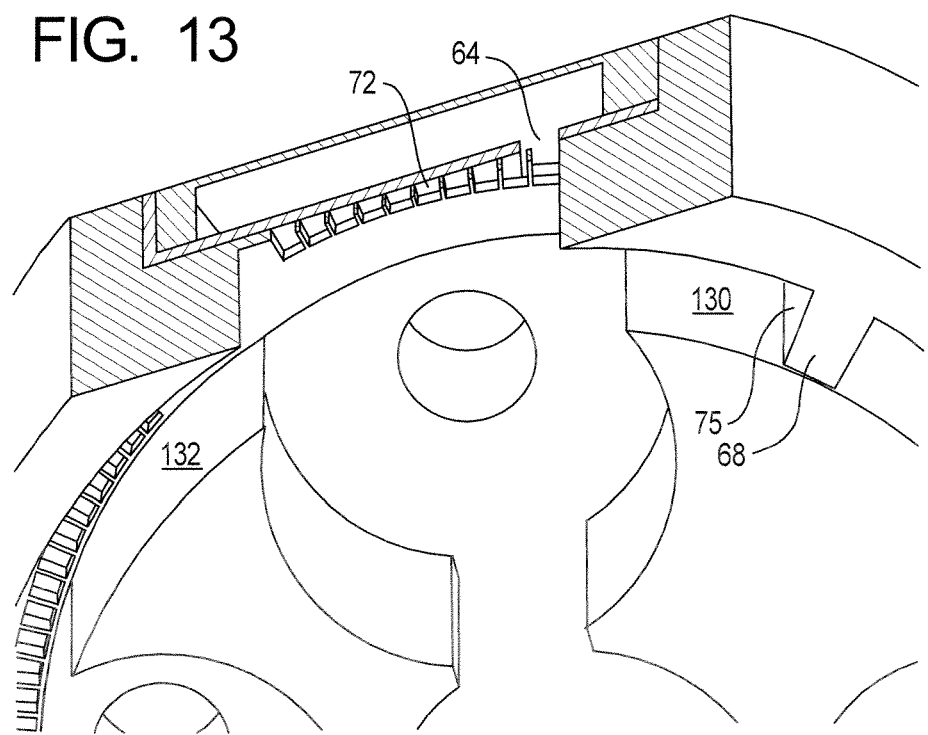
FIG. 13 shows another view of the power tooth further along a point of rotation where the expansion ports are still in communication with the outlet port of the combustion chamber.

Now referring to FIG. 13, it can be seen that the chamber 130 is expanded and the expansion ports 72 supply expanding gas upon the rearward surface 75 of the tooth 68 in FIG. 8 is still in communication with the outlet port 64. It should further be noted that the chamber indicated at 132 rotationally preceding chamber 130 will soon be filling the combustion chamber 21 in a substantially similar manner as described above. The chamber 130 will continue to expand and produce a tangential force vector 134.

With the foregoing detailed description of the operation of the radially spaced ports with reference to FIGS. 9-13 above, there will now be further description of the same process with a slightly more schematic view of the device 20 with reference to FIGS. 14-22. It should be noted that the beginning of this section describes a general operation that is about to be described. Whereas now a more detailed description with cross referencing to the above disclosed components to other figures will now be undertaken with the process flow description started in FIG. 14.

As shown in FIG. 14, the chamber 119 intakes gas from the input port 100, which referring back to FIG. 1, is placed in the cap 35. As the tooth 68 rotates in a manner as shown by the rotational vector 124, it can be appreciated in FIG. 15, that the chamber 119 is fully charged with air and the preceding tooth 68a is advancing toward the chamber 119 as shown from FIGS. 15 to 16. After the tooth 68a has passed the piston valve 34 as shown in FIG. 17, the chamber now referred to as 120 is in the compression phase where the schematic port indicated at 62a is actually that as shown in FIG. 9, where essentially the port 62a in FIG. 17 is the radially inward port 62 of FIG. 9 and the compression ports 70 are in indication therewith. Now referring back to FIG. 18, it can be appreciated that the combustion chamber schematically indicated at 21 is undergoing combustion where pursuant to a desirable flame propagation theory, at some point in some manner a spark is induced to combust and increase the pressure in volume of the gas therein.

Figure 19:
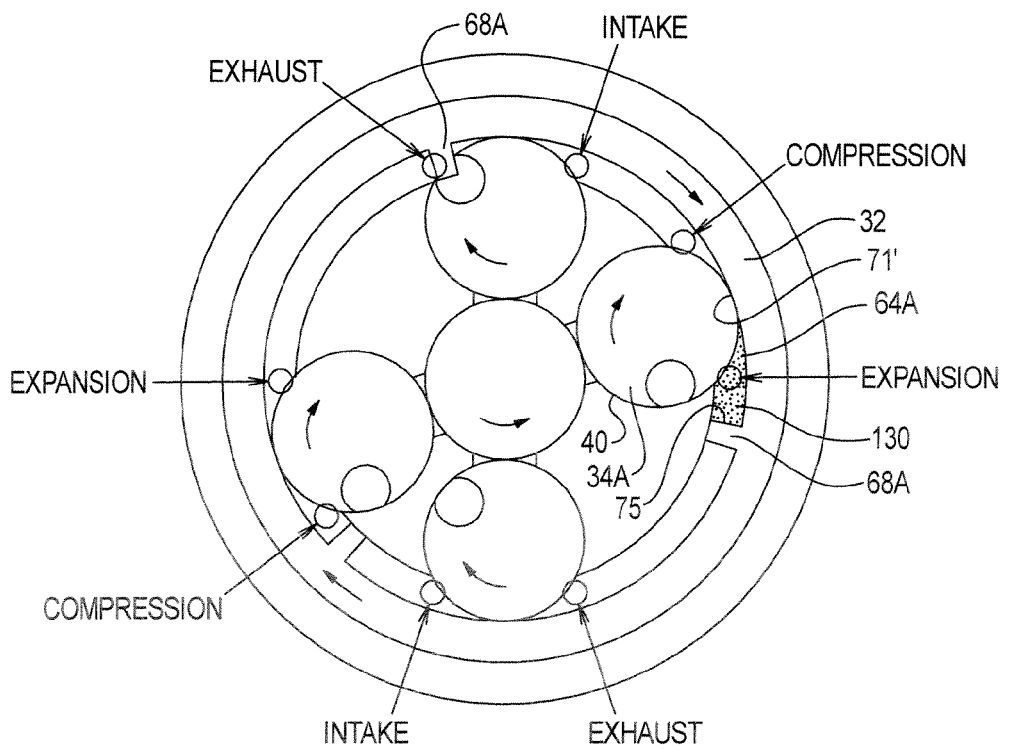
FIG. 19 shows the beginning of the expansion process where the tooth passes the piston valve and expansion ports of the power ring are in communication with outlet ports of the combustion chamber.

FIG. 19 is a schematic version of FIG. 12 where the outlet port 64a schematically shown in FIG. 19 is actually that as shown in the partial sectional view of FIG. 12, where the radially outward ports 64 are in communication with the expansion ports 72 of the static structure which is in communication with the combustion chamber 21. This expanding chamber 130 tangential force upon the rearward surface 75 of the tooth 68a as shown in FIG. 19 (similar to the tooth 68 of FIG. 12).

FIG. 20 shows the chamber 130 expanding with the power tooth 68a further advanced in the direction of rotation as indicated by the rotational vector 124. Now referring to FIG. 21, the schematic version of the device 20 shows the tooth 68a passing the rotary piston valve 34B whereby the chamber 130 is in communication with the port 98 that is similar to that as shown in FIG. 1 in the lower left-hand portion. Of course, the ports can be arranged in a variety of orientations to cooperate with the surrounding atmosphere or other piping.

FIG. 22 schematically shows the operation of the various portions of the device 20 as it occurs simultaneously. Basically, the chamber 149 is purging gas therein to the port 98, the chamber 151 is expanding from an explosion of the combustion chamber in a indication therewith. The chamber 153 is filled with fresh intake air that is adapted to be combusted when the tooth 68c passes the piston valve 34. The chamber 155 is intaking air through the inlet port 100; the chamber 157 is compressing gas into a combustion chamber and in communication therewith. Finally, the chamber 159 is fully expanded and has cut off communication with the combustion chamber where combusted air therein is exhausting through the exhaust port 98.

Now referring to FIG. 23, there is shown another embodiment of the engine indicated at 20a which is a pump embodiment. Essentially, in this form the componentry is very similar to the previous embodiment although in this form the device can be a pump where torque is applied to the center wheel 92a for pumping fluid or in the case of a hydroturbine, torque is extracted therefrom. As shown in FIG. 23, the cap 35a has an inlet port 160 and an outlet port 162 at various rotational locations in conjunction with the rotary piston about 34A. Essentially, it is imperative that the chamber is defined by the rotary piston 34A and that the power ring 32 provide an opening to the ports to avoid compression or expansion of any sealed chamber. As shown in FIG. 24, there is another partial cross-sectional view where it can be appreciated that if the power ring 32a rotates in a manner as shown by rotational vector 170, the inlet port 160 is going to provide an influx of fluid therein. In other words, after the power tooth 68' passes the port 160, the resulting chamber will suck fluid through port 160. In a similar fashion, the preceding tooth not shown in FIG. 24 will force fluid out through port 162 of the chamber defined and indicated at 174.

Figure 25:
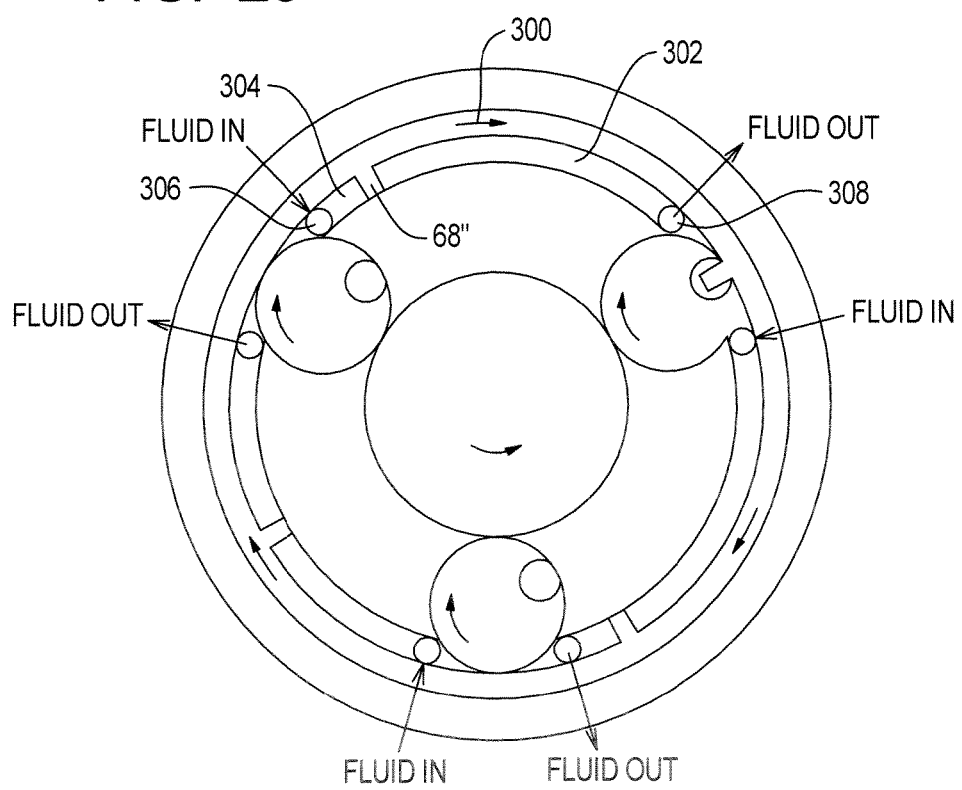
FIG. 25 shows a schematic embodiment of the device utilized as a pump or water turbine.

FIG. 25 shows an embodiment where the ports are constructed in a different manner, where given the direction of rotation 300, the power tooth indicated at 68 is simultaneously compressing the fluid in the chamber 302 and drawing fluid inward in the chamber 304 through the ports 306. The fluid within the chamber 302 is exited to the ports 308. Of course this process is occurring at various locations radially around the device. As shown in FIG. 25, in this embodiment there are for power teeth and three piston valves with an accompanying three sets of inlet and outlet ports.

In the preferred embodiment engine design, and referring back to FIG. 4, to achieve the super expansion as previously mentioned, arranging the rotary valves and in an equally spaced configuration allows for very efficient super expansion cycles. This includes arranging the power teeth in one or more preferred arrangements such as placing the power teeth at approximately 120° radial locations about the power ring, placing the piston valves at spacings of approximately 75° radially about the rotational axis, or spacing the piston valves at approximately 115° radially about the rotational axis 43 of the device 20. Optimally, the piston valves are spaced radially to provide for a corresponding expansion ratio of approximately 1.4.

It should be noted that the assembly as recited in FIG. 1 can have a plurality of power portions 22 operating in parallel. Further, in certain forms, it may be possible to have the pump arrangement as shown in FIGS. 23-25 axially aligned to a combustion engine whereby the pump would pressurized a hydraulic-like fluid and the gearing arrangement could or could not be present were the output work can be executed by way of the pressurized fluid. At any rate, some work may be extracted from the gearing system, or the gearing system may be used for alignment of the piston valve is and all of the work is extracted from the chambers 174. The piston valves 34A (of FIG. 23) could be coupled to the piston valve is 34 (of FIG. 1) or by way of the gearing system, or by simply transmitting toward through a common power ring 32, work would be extracted from power teeth altering the pressure in a chamber similar to that as 174 shown in FIG. 24. Alternately, the pump can be axially aligned with the combustion engine device similar to that is shown in FIG. 1 whereby the pump operates a secondary function of transmitting a fluid such as a cool fluid throughout an overall system were cooling is needed. Of course there are various possibilities of arranging the device to fit the particular need and circumstance in any given situation.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicant's general concept.

I claim:

1. A method of extracting energy from an expanding gas, the method comprising:
    a) channeling air through an input port into a chamber defined in part by a power ring having a plurality of power teeth where a forward motion of a power tooth creates an expanding chamber defined in part by a trailing surface of the power tooth and a portion of a cylindrical surface of a first piston valve,
    b) passing a second power tooth through a slotted region of the first piston valve where a forward surface of the second power tooth compresses said air through a compression port positioned at a first radial location on the power ring,
    c) fluidly communicating the compression port with an inlet port of a combustion chamber where the air is compressed therein,
    d) closing said fluid communication between the inlet port and the compression ports,
    e) passing the second power tooth through a slot region of a second piston valve,
    f) mixing the air with a combustible fuel,
    g) igniting said mixing air and combustive fuel thereof,
    h) fluidly communicating an outlet port with the combustion chamber at a second radial location which is a different radial location than the first radial location of the inlet port and the outlet port communicates with an expansion port trailing the second power tooth and the expansion port is positioned at the second radial location,
    i) allowing the expanding gas to provide a force upon the trailing surface of the second power tooth to provide a torque about the power ring,
    j) passing a third tooth through the slot region of the second piston valve where a forward surface of the third tooth positively displaces the combustion mixture forward out of the outlet port.

2. The method as recited in claim 1 wherein the channeling air through compression port and expansion port is such that said compression port and said expansion port are radially positioned at a radially inward location and a radially outward location respectively where the circular paths of said compression port and said expansion port are on separated circular radii.

3. The method as recited in claim 1 further comprising a step of engaging an outer surface of the second piston valve and an inner surface of the power ring in a tighter fit during a portion of the communication between the expansion port of the power ring and the outlet port in communication with the combustion chamber to ensure a tighter seal.

4. The method as recited in claim 1 utilizing four piston valves and three power teeth.

5. The method as recited in claim 4 coupling each piston valve to a rotary gear where the four rotary gears are in rotational communication with a central gear and extracting torque from the central gear for usable work energy.

6. The method as recited in claim 5 further comprising a step of removing a portion of the piston valves at the opposing end of the slot region to balance the piston valves about their respective rotation axes.

7. The method as recited in claim 1 utilizing 3 piston valves and 4 power teeth.

8. The method as recited in claim 1 coupling each piston valve to a rotary gear where the 3 rotary gears are in rotational communication with a central gear and torque is extracted from the central gear.

9. The method as recited in claim 1 further comprising a step of providing the piston valves with a recessed region at an opposing portion of the piston valve to the slot region whereby the center of mass of rotation of the piston valves is approximately at the center axis of rotation of the piston valves.

* * * * *